United States Patent Office 3,803,286
Patented Apr. 9, 1974

3,803,286
METHOD FOR PRODUCING HIGHLY ORIENTED
PRODUCT OF ACRYLONITRILE POLYMER
Kazuo Nakatsuka, Tokyo, and Shunsuke Minami and
Kenzi Murase, Ontake, Japan, assignors to Mitsubishi
Rayon Co., Ltd., Tokyo, Japan
No Drawing. Filed Dec. 16, 1971, Ser. No. 208,874
Claims priority, application Japan, Dec. 16, 1970,
45/112,801
Int. Cl. B29b 1/12; B29c 3/00
U.S. Cl. 264—331
2 Claims

ABSTRACT OF THE DISCLOSURE

A highly oriented acrylonitrile polymer product comprising assembly of oriented fibrils can be obtained by previously molding polyacrylonitrile, acrylonitrile copolymer containing at least 75% by weight of acrylonitrile or mixture thereof into a block product and then extruding the pre-molded acrylonitrile polymer through a nozzle at a ratio expressed by reduction of sectional area of at least 3.5 at a pressure of 100 to 50,000 kg./cm.$^2$ at a temperature of 50° to 300° C.

Thus obtained product is useful as raw materials for synthetic paper, nonwoven fabrics, composite materials, etc.

---

The present invention relates to a highly oriented product of acrylonitrile polymer and a method for producing the product. More particularly the present invention relates to a method for producing a highly oriented acrylonitrile polymer product comprising assembly of highly oriented fibrils by premolding acrylonitrile polymer into a block product and then uniaxially extruding the premolded acrylonitrile polymer, through a nozzle, at a suitable pressure and temperature.

Recently, utilization of fibrils of synthetic high polymers as raw materials for paper, non-woven fabrics and composite materials has become increasingly important. In the field of synthetic paper and nonwoven fabrics, synthetic high polymers are superior to natural high polymers in tear strength, water resistance, chemical resistance, etc., but inferior to natural high polymers in rigidity and toughness.

Furthermore, composite plastic materials have also been widely used for pipes, electric articles, sports-goods, tanks, pressure vessels, etc. and as most of the reinforcing materials therefor, glass fibers, metallic fibers, boron, graphite, etc. have been used. However, because of low affinity between those reinforcing materials and plastics, various after treatments are required for producing such composite plastic materials and in addition, said reinforcing materials are expensive.

The synthetic fibers obtained by the conventional methods are not suitable as reinforcing materials for plastics. This is attributable to their low Young's modulus, low rigidity and high elongation. It has been considered that these properties can be improved by forming highly oriented fibrils having a compact structure, but such has not yet been attained by the conventional methods.

During the course of intensive researches in an attempt to easily produce highly oriented fibrils, it has now been found that an acrylonitrile polymer is molded at suitable pressure and temperature to obtain a premolded product and said premolded product is extruded at a predetermined reduction ratio at a suitable pressure and temperature to obtain a highly oriented product which comprises assembly of highly oriented fibrils and thus obtained product can be easily made into a raw material for paper, nonwoven fabrics and composite materials by the usual crushing methods such as beating, mixer treatment, etc.

The present invention will be more fully explained hereinafter.

The present invention concerns a method for producing a highly oriented product for acrylonitrile polymer which comprises previously molding a polyacrylonitrile, acrylonitrile copolymer containing at least 75% by weight of acrylonitrile or a mixture thereof into a block product of a predetermined size and then extruding thus obtained premolded block product through a nozzle at a temperature of 50° to 300° C. and under a pressure of 100 to 50,000 kg./cm.$^2$ in such a manner that the ratio (R) expressed by reduction of sectional area at one step is at least 3.5, preferably 3.5 to 60.0. In the present invention polyacrylonitrile and acrylonitrile copolymer may be pretreated under suitable conditions explained hereinafter. The premolding as mentioned above is effected in order that pressure can be uniformly applied on the polymer at the subsequent extrusion and that the material can be easily handled. As to the premolding condition, it may be carried out at a temperature higher than ambient temperature and at a pressure higher than 100 kg./cm.$^2$. It is not important whether the premolded product is transparent or not. Therefore, the premolded product may be any product of compression-molding of polymer powders or polymer granules, polymerization-molding of monomer and solvent-casting of polymer. Density of the premolded product is preferably higher than 0.6 g./cm.$^2$.

The premolded product having a predetermined size is charged into a high pressure extruding cylinder kept at a temperature of 50° to 300° C. and is subjected to extrusion. In this step, since lower coefficient of friction between the premolded product and the inner surface of the metal cylinder or nozzle makes it possible to more effectively utilize the pressure, suitable lubricating oils such as silicon oil, castor oil, soybean oil, mineral oils, etc. are preferably used. However, the extrusion may be easily carried out without the lubricating oils by suitable combination of the temperature and pressure. The extrusion pressure may vary depending upon kind of polymer and temperature, but productivity is conspicuously reduced at a pressure of lower than 100 kg./cm.$^2$ and operability of apparatus becomes lower at higher than 50,000 kg./cm.$^2$.

The acrylonitrile polymer used in the present invention includes polyacrylonitrile, a copolymer containing at least 75% by weight of acrylonitrile and a mixture thereof produced by the conventional methods. However, it is preferable for obtaining a highly oriented acrylonitrile polymer product which can be easily fibrillated that said polymer does not display a distinct absorption of tan $\delta$ with an intensity of at least 0.10 at a temperature lower than −20° C. in temperature characteristic of dynamic viscoelasticity measured at 110 C./S. Polymer blends with different kind of polymers may be used under the same extruding conditions with the broader composition ranges. However, when the amount of the other polymers in the polymer blend exceeds 50% in volumeric ratio, those which have a glass transition temperature of lower than 20° C. or of higher than 300° C. are not preferred.

Further characteristic of the present invention is that the polymer used has a little limitation in polymerization degree and such polymers as having a low molecular weight at which the usual spinning and extrusion are impossible or having a number average molecular weight of higher than 10,000 may also be used. Furthermore, such acrylonitrile polymers as having been subjected to heat treatment at a high temperature or alkali treatment to give a suitable amount of cyclic structure in a polymer main chain may also be used and in this case, the extruded products, for example fibers or fibrils are markedly excellent in chemical resistance and heat resistance and have a high elastic modulus. That is, above mentioned acrylonitrile polymer in the powdery, granular or premolded form may be subjected to heat treatment at a temperature of 200° to 300° C. in an inert atmosphere or alkali treatment thereby the polymer becomes from yellow to blackish brown color tone. Said polymer can be used as a starting material in the present invention.

It has become clear that thus obtained extruded products not only have a high orientation of higher than 70% which is derived from the distribution curve around $2\theta = 16.7°$ in X-ray diffraction diagram, but also show a half value width of smaller than 1.0° which is obtained from the radial distribution curve. For example, the half value width of the conventional acrylic fibers in X-ray diffraction is at least 1.0 to 3.0°, while the extruded fibers according to the present invention have a half value width of 0.7° to 0.8° and possess compact structure. Furthermore, it has been surprisingly found that the fibers according to the present invention have lower shrinkage at a high temperature as compared with the conventional stretched fibers having the similar orientation, i.e., the shrinkage of the former is about one-fifth or one-fiftieth of that of the latter.

The extruded product according to the present invention comprises assembly of fibrils having the characteristics as mentioned above, and has an apparent density which is more than 0.7 times that of the starting polymer, and has such transparency that it seems to be hardly fibrillated by beating operation, etc. The product is ideal extruded material which can be easily handled and storaged.

The ultilization of the fibrils from the products according to the present invention gives unexpected characteristics to synthetic paper, raw material of composite materials, nonwoven fabrics, etc. The extruded product itself may be used as it is, in accordance with the uses.

The present invention will be illustrated in the following examples.

EXAMPLE 1

Acrylonitrile polymer powders having a numerical average molecular weight of 100,000 shown in Table 1 were prepared by precipitation polymerization with redox catalyst of ammonium persulfate and sodium bisulfite. The polymer powders thus prepared were premolded and then extruded through a nozzle under the conditions shown in Table 1.

beating. Thus obtained fibrils and a shrinkage of 1.5% when heated up to 200° C. and an elastic modulus of $1 \times 10^{11}$ dyn./cm.$^2$.

EXAMPLE 3

Acrylonitrile copolymer containing 10% by weight of vinyl acetate was boiled in 10% solution of potassium hydroxide in methanol for one hour to obtain powders of yellowish brown. Said powders were dried, deaired and then premolded under 3000 atm./cm.$^2$ at 100° C. Thus premolded product was extruded through a nozzle at a reduction ratio of 6.6 under 2000 kg./cm.$^2$ at 180° C. Thus obtained strands had brown color and showed transparent appearance. The fibrils obtained by beating said strands had an orientation of 87.7% by X-ray measurement, a half value width of 0.79 and an elastic modulus of $8 \times 10^{10}$ dyn./cm.$^2$.

EXAMPLE 4

Polyacrylonitrile was heat treated in nitrogen stream at 280° C. for 15 minutes to obtain powders of blackish brown. The powders were premolded under 3000 kg./cm.$^2$ at 180° C. Thus obtained premolded product was extruded through a nozzle at a reduction ratio of 16.5 under 14,000 kg./cm.$^2$ at 200° C. to obtain strands having black color and transparent appearance. Said strands showed substantially no thermal shrinkage when heated up to 200° C. and had an orientation of 92.5% by X-ray measurement, a half value width of 0.76 and an elastic modulus of $1.1 \times 10^{11}$ dyn./cm.$^2$. The strands could be easily fibrillated by beating.

What is claimed is:

1. A method for producing a highly oriented product of acrylonitrile polymer, which comprises
    (a) premolding an acrylonitrile polymer selected from the group consisting of acrylonitrile homopolymer, acrylonitrile copolymer containing at least 75% by weight of acrylonitrile and less than 25% of at least one monoethylenically unsaturated monomer copolymerizable with acrylonitrile and mixtures thereof, into a block product at a temperature higher than ambient temperature and at a pressure higher than 100 kg./cm.$^2$ the resulting premolded acrylonitrile polymer having an apparent specific gravity of higher than 0.60 g./cm.$^3$;
    (b) extruding the thus premolded acrylonitrile polymer through a nozzle at a ratio expressed by reduction of sectional area of at least 3.5 under a pressure of 100 to 50,000 kg./cm.$^2$ at a temperature of 50° to 300° C.

2. A method according to claim 1, wherein the starting acrylonitrile polymer is subjected to heat treatment in the powdery, granular or premolded form at a temperature of 200° to 300° C. in an inert atmosphere to obtain yellow or brackish brown polymer.

TABLE 1

| | Polymers | Pre-molding conditions | | Extruding conditions | | Reduction ratio | Fibrillation | Orientation, percent | Half value width | Apparent specific gravity (g./cm.$^2$) |
|---|---|---|---|---|---|---|---|---|---|---|
| | | Temp. (°C.) | Pressure (kg./cm.$^2$) | Temp. (°C.) | Pressure (kg./cm.$^2$) | | | | | |
| 1 | PAN | 160 | 450 | 130 | 7,000 | 6.7 | O | 84.0 | 0.76 | 1.16 |
| 2 | PAN | 160 | 450 | 180 | 3,000 | 8.8 | O | 87.0 | 0.73 | 1.18 |
| 3 | PAN | 130 | 450 | 160 | 15,000 | 12.0 | O | 92.0 | 0..3 | 1.18 |
| 4 | {93-7 P(AN-VAc)} | 130 | 450 | 130 | 4,000 | 8.8 | O | 86.1 | 0.89 | 1.16 |
| 5 | {93-7 P(AN-VAc)} | 130 | 450 | 180 | 600 | 4.5 | O | 74.0 | 0.92 | 1.16 |
| 6 | {93-7 P(AN-VAc)} | 130 | 450 | 180 | 35,000 | 34.0 | O | 93.0 | 0.78 | 1.19 |
| 7 | {93-7 P(AN-VAc)} | 50 | 450 | 110 | 7,000 | 6.7 | O | 85.0 | 0.84 | 1.15 |
| 8 | PAN | 100 | 450 | 120 | 5,000 | 4.5 | O | 80.0 | 0.79 | 1.00 |
| 9 | {PAN 40 P(AN-VAc)60} | 140 | 450 | 100 | 30,000 | 6.5 | O | 84.0 | 0.79 | 1.15 |
| 10 | Fibers according to the conventional stretching (PAN) | | | | | (¹) | X | 88.0 | 1.11 | 1.19 |

¹ Stretching to 12 times.

EXAMPLE 2

Polyacrylonitrile having a polymerization degree of 100,000 which was heat treated in nitrogen stream at 250° C. for 30 minutes was premolded under 1000 kg./cm.$^2$ at 130° C. into a rod. Thus obtained rod was extruded through a nozzle at a reduction ratio of 11.5 under 5000 kg./cm.$^2$ at 130° C. Thus obtained extruded product had blackish brown color at normal temperature, an orientation of 89.8% by X-ray measurement and a half value width of 0.73 and could be fibrillated by (References on following page)

References Cited

UNITED STATES PATENTS

| | | | |
|---|---|---|---|
| 2,585,444 | 2/1952 | Coxe | 264—182 |
| 2,710,846 | 6/1955 | Dietrich et al. | 264—182 |
| 2,953,816 | 9/1960 | Kidder | 264—323 |
| 2,987,775 | 6/1961 | Albrecht et al. | 264—323 |
| 3,412,177 | 11/1968 | Griffith | 264—331 |
| 3,437,726 | 4/1969 | Hagmann | 264—323 |
| 3,470,291 | 9/1969 | Johnson | 264—292 |
| 3,493,648 | 2/1970 | Griffith | 264—176 R |
| 3,531,452 | 9/1970 | Griffith et al. | 264—235 |
| 3,662,052 | 5/1972 | Nowak et al. | 264—294 |
| 3,714,320 | 1/1973 | Shaw | 264—176 R |

JAY H. WOO, Primary Examiner

U.S. Cl. X.R.

264—176 R, 329